(12) United States Patent
Chen et al.

(10) Patent No.: US 11,875,523 B2
(45) Date of Patent: Jan. 16, 2024

(54) ADAPTIVE STEREO MATCHING OPTIMIZATION METHOD AND APPARATUS, DEVICE AND STORAGE MEDIUM

(71) Applicant: ShanghaiTech University, Shanghai (CN)

(72) Inventors: Fupeng Chen, Shanghai (CN); Heng Yu, Shanghai (CN); Yajun Ha, Shanghai (CN)

(73) Assignee: ShanghaiTech University, Shanghai (CN)

( * ) Notice: Subject to any disclaimer, the term of this patent is extended or adjusted under 35 U.S.C. 154(b) by 201 days.

(21) Appl. No.: 17/286,488

(22) PCT Filed: Sep. 20, 2019

(86) PCT No.: PCT/CN2019/106873
§ 371 (c)(1),
(2) Date: Apr. 19, 2021

(87) PCT Pub. No.: WO2020/151244
PCT Pub. Date: Jul. 30, 2020

(65) Prior Publication Data
US 2021/0390725 A1    Dec. 16, 2021

(30) Foreign Application Priority Data
Jan. 23, 2019 (CN) .......................... 201910063133.6

(51) Int. Cl.
*G06K 9/00* (2022.01)
*G06T 7/593* (2017.01)
*G06F 17/12* (2006.01)

(52) U.S. Cl.
CPC .............. *G06T 7/593* (2017.01); *G06F 17/12* (2013.01); *G06T 2207/10012* (2013.01); *G06T 2207/20004* (2013.01); *G06T 2207/20081* (2013.01)

(58) Field of Classification Search
CPC ........... G06T 7/593; G06T 2207/10012; G06T 2207/20004; G06T 2207/20081; G06F 17/12
(Continued)

(56) References Cited

FOREIGN PATENT DOCUMENTS

| CN | 104574391 A | 4/2015 |
|----|-------------|--------|
| WO | WO2013128765 A1 | 9/2013 |

OTHER PUBLICATIONS

Seki, Akihito, and Marc Pollefeys. "Patch Based Confidence Prediction for Dense Disparity Map." BMVC. vol. 2. No. 3. 2016. (Year: 2016).*
(Continued)

*Primary Examiner* — Jonathan S Lee
(74) *Attorney, Agent, or Firm* — IPRTOP LLC (57) ABSTRACT

The present disclosure provides an adaptive stereo matching optimization method, apparatus, and device, and a storage medium. The method includes: acquiring images of at least two perspectives of the same target scene, accordingly obtaining, through calculation, disparity value ranges corresponding to pixels in the target scene; and obtaining optimized depth value ranges by adjusting the disparity value ranges of the pixels in the target scene in real time through an adaptive stereo matching model; adjusting an execution cycle in the adaptive stereo matching model in real time through a DVFS algorithm according to a resource constraint condition of the processing system; and/or training on a plurality of scene image data sets through a convolutional neural network, so that the specific function
(Continued)

Images of at least two perspectives of the same target scene are acquired, and disparity value ranges corresponding to pixels in the target scene are accordingly obtained through calculation. — S101

The disparity value ranges of the pixels in the target scene are adjusted in real time through an adaptive stereo matching model, to obtain an optimized depth value range; adjusting an execution cycle in the adaptive stereo matching model in real time through a DVFS algorithm according to a resource constraint condition of the processing system; and/or training on a plurality of scene image data sets through a convolutional neural network, so that specific function parameters in the adaptive stereo matching model are correspondingly adjusted in real time according to acquired different scene images. — S102 parameters in the adaptive stereo matching model are correspondingly adjusted in real time according to the acquired different scene images.

12 Claims, 2 Drawing Sheets

(58) Field of Classification Search
USPC .......................................................... 382/154
See application file for complete search history.

(56) References Cited

OTHER PUBLICATIONS

Park, Jong-Il, and Seiki Inoue. "Acquisition of sharp depth map from multiple cameras." Signal Processing: Image Communication 14.1-2 (1998): 7-19. (Year: 1998).*

Lee, Kyuho, et al. "An energy-efficient parallel multi-core ADAS processor with robust visual attention and workload-prediction DVFS for real-time HD stereo stream." 2016 IEEE Symposium in Low-Power and High-Speed Chips (Cool Chips XIX). IEEE, 2016. (Year: 2016).*

Yu, Heng, Yajun Ha, and Jing Wang. "Quality optimization of resilient applications under temperature constraints." Proceedings of the Computing Frontiers Conference. 2017. (Year: 2017).*

Li, Zhiwei, "VLSI Architecture Design for Convolutional Neural Network Based Binocular Stereo Matching", <Chinese Master's Theses Full-text Database, Information Science>, Jan. 15, 2019(Jan. 15, 2019), INO:12, ISSN: 1674-0246, (chapter 2, sections 2.2 and 2.3, and the abstract), CAJEPH, CN.

Chen, Xinyuan, "Energy-Efficient Real-Time Scheduling for Periodic Tasks on Multiprocessor System", <Chinese Master's Theses Full-text Database, Information Science and Technology>, Jan. 15, 2019(Jan. 15, 2019), INO:01, ISSN: 1674-0246, chapter 3, sections 3.2-3.5, CAJEPH, CN.

* cited by examiner

ADAPTIVE STEREO MATCHING OPTIMIZATION METHOD AND APPARATUS, DEVICE AND STORAGE MEDIUM

CROSS REFERENCES TO RELATED APPLICATIONS

This is a Sect. 371 National Stage application of a PCT International Application No.: PCT/CN2019/106873, filed on Sep. 20, 2019, which claims priority of a Chinese Patent Applications No. 2019100631336, filed on Jan. 23, 2019, the content of which is hereby incorporated by reference in its entirety for all purposes.

TECHNICAL FIELD

The present disclosure relates to the field of image processing technology, and in particular, to an adaptive stereo matching optimization method and apparatus, device and storage medium.

BACKGROUND

Stereo matching is an effective method for intelligent vehicles to find the depth of nearby objects. Stereo matching transforms the traditional stereo matching algorithm into an adaptive stereo matching algorithm, which maximizes the quality (accuracy of depth) of stereo matching. The longer the execution cycle of the adaptive stereo matching (ASM) task, the higher the quality. However, it is very challenging for the intelligent vehicles to support the adaptive function. On the one hand, it is difficult to get an accurate model between quality and execution cycle; on the other hand, under the strict timing and energy constraints of intelligent vehicles, how to schedule ASM tasks on multiprocessors to generate the largest execution cycle is a challenge.

Although adaptive stereo matching (ASM) has high application prospects, there are several important issues that need to be solved to obtain the best and most practical application in intelligent vehicle systems, including: (1) accurately modeling the relationship between output quality adaptation and execution cycle; (2) optimizing and determining the system execution parameters that maximize the quality, such as operating voltage or execution frequency of the processor; (3) accurately estimating the parameters of the quality function model. Since the parameters depend on the input image, extensive analysis on stereo matching may still result in low accuracy.

SUMMARY

The present disclosure provides an adaptive stereo matching optimization method and apparatus, device and storage medium, to solve the problem of low output quality and low depth estimation accuracy of the traditional adaptive stereo matching.

The present disclosure provides an adaptive stereo matching optimization method applied to a processing system. The method includes: acquiring images of at least two perspectives of the same target scene, and accordingly obtaining, through calculation, disparity value ranges corresponding to pixels in the target scene; obtaining optimized depth value ranges by adjusting the disparity value ranges of the pixels in the target scene in real time through an adaptive stereo matching model; adjusting an execution cycle in the adaptive stereo matching model in real time through a DVFS algorithm according to a resource constraint condition of the processing system; and/or training on a plurality of scene image data sets through a convolutional neural network, so that specific function parameters in the adaptive stereo matching model are correspondingly adjusted in real time according to acquired different scene images.

In an embodiment of the present disclosure, the resource constraint condition of the processing system includes energy constraint, response time constraint, and heat constraint.

In an embodiment of the present disclosure, the adaptive stereo matching model is an exponential function model, and the specific formula is:

$$\mathcal{F}_e(o) = a \times (1 - e^{-\frac{o}{b}}) + m;$$

a, b, m are the specific function parameters; o is the execution cycle.

In an embodiment of the present disclosure, the resource constraint condition of the processing system includes: energy constraint, response time constraint, and heat constraint; the adjusting of the execution cycle in the adaptive stereo matching model in real time through the DVFS algorithm includes: converting an exponential function model into a quality QP model, and obtaining a quality formula as follows:

$$\sum_i (\mathcal{F}_{e,i}(o_i + \Delta o_i) - \mathcal{F}_{e,i}(o_i)) = \sum_i a_i \left(-e^{-\frac{o_i + \Delta o_i}{b_i}} + e^{-\frac{o_i}{b_i}}\right);$$

$a_i$, $b_i$ are specific function parameters; $o_i$ is the initial execution cycle; $\Delta o_i$ is the execution cycle to be improved; after Taylor formula expansion and a certain number of derivations, the transformation formula is as follows:

$$\sum_i a_i \left(\left(\frac{1}{2b_i^2} e^{-\frac{o_i}{b_i}}\right) \Delta o_i^2 + \left(-\frac{1}{b_i} e^{-\frac{o_i}{b_i}}\right) \Delta o_i\right)$$

The transformation formula needs to satisfy the resource constraint condition of the processing system.

In an embodiment of the present disclosure, the formulas that the transformation formula needs to satisfy the resource constraint condition of the processing system include: A, energy constraint: $\Sigma_i \ (o_i + \Delta o_i)(C^f v_i^2 + K_\beta v_i + P_{i0,lkg} + K_\alpha T_i) f_i^{-1} \le \epsilon_s$; $o_i$ is the initial execution cycle; $\Delta o_i$ is the execution cycle to be improved; $f_i$ is the frequency of the processing system; $v_i$ is the power supply voltage of the processing system; $C^f v_i^2$ represents dynamic power consumption; $P_{i0,lkg}$ represents the initial power of a specific linear part; $T_i$ is the temperature of the processing system; $K_\alpha$ and $K_\beta$ are respectively the slopes of the leakage current power corresponding to the temperature and voltage in the specific linear part; $C^f v_i^2 + K_\beta v_i + P_{i0,lkg} + K_\alpha T_i$ represents the total power; $\epsilon_s$ is the energy budget of the processing system; B, response time constraint:

$$\frac{(o_i + \Delta o_i)}{f_i} \le \tau_s;$$

$o_i$ is the initial execution cycle; $\Delta o_i$ is the execution cycle to be improved; $f_s$ is the frequency of the processing system; $\tau_s$ is the time budget of the processing system; C, heat constraint: $\vec{T}^l \leq \Psi_1^f \vec{v}^2 + \Psi_2^f \vec{v} + \Phi^{f,T} \leq \vec{T}^u$; $\vec{v} = [v_1, v_2, \ldots, v_{numP}]^T$, $\vec{T}^u$ and $\vec{T}^l$ are respectively the vectors of the upper limit and the lower limit of heat; $\Psi_1^f$, $\Psi_2^f$ and $\Phi^{f,T}$ are coefficient matrices determined by frequency, power, and thermal conductivity, respectively.

In an embodiment of the present disclosure, the obtaining of the optimized depth value ranges by adjusting the disparity value ranges of the pixels in the target scene in real time through the adaptive stereo matching model includes: estimating the depth value range according to the disparity value range, the depth value is inversely proportional to the disparity value.

In an embodiment of the present disclosure, the training on the plurality of scene image data sets through the convolutional neural network, so that the specific function parameters in the adaptive stereo matching model are correspondingly adjusted in real time according to the acquired different scene images includes: the input terminal of the convolutional neural network is the scene image data set; the output terminal of the convolutional neural network is a normalized probability of the estimated specific function parameter; offline training on the plurality of scene image data sets, such that the specific function parameters in the adaptive stereo matching model are correspondingly adjusted in real time according to the acquired different scene images.

The present disclosure further provides an adaptive stereo matching optimization apparatus. The apparatus includes: an acquisition module, to acquire images of at least two perspectives of the same target scene, and accordingly obtain, through calculation, disparity value ranges corresponding to pixels in the target scene; a processing module, for obtaining optimized depth value ranges by adjusting the disparity value ranges of the pixels in the target scene in real time through an adaptive stereo matching model; adjusting an execution cycle in the adaptive stereo matching model in real time through a DVFS algorithm according to a resource constraint condition of the processing system; and/or training on a plurality of scene image data sets through a convolutional neural network, so that specific function parameters in the adaptive stereo matching model are correspondingly adjusted in real time according to acquired different scene images.

The present disclosure further provides an adaptive stereo matching optimization device. The device includes a memory, a processor, and a communicator; the memory stores a computer program; the processor executes the computer program stored in the memory, and when the program is executed, the above-mentioned adaptive stereo matching optimization method is implemented; the communicator communicably connects with external devices.

The present disclosure further provides a computer readable storage medium, which stores a computer program, when the program is executed by the processor, the above-mentioned adaptive stereo matching optimization method is implemented.

As mentioned above, the present disclosure provides an adaptive stereo matching optimization method, apparatus, and device, and a storage medium. The method includes: acquiring images of at least two perspectives of the same target scene, accordingly obtaining, through calculation, disparity value ranges corresponding to pixels in the target scene, and obtaining optimized depth value ranges by adjusting the disparity value ranges of the pixels in the target scene in real time through an adaptive stereo matching model; adjusting the execution cycle in the adaptive stereo matching model in real time through a DVFS algorithm according to a resource constraint condition of a processing system; and/or training on a plurality of scene image data sets through a convolutional neural network, so that the specific function parameters in the adaptive stereo matching model are correspondingly adjusted in real time according to the acquired different scene images.

The method has the following advantages:

The output quality can be flexibly adjusted (small error) according to different scene image pixels while a system resource constraint condition of a processing system is satisfied, thereby greatly improving the accuracy of depth estimation.

DETAILED DESCRIPTION OF THE PREFERRED EMBODIMENTS

The embodiments of the present disclosure will be described below. Those skilled can easily understand other advantages and effects of the present disclosure according to contents disclosed by the specification. The present disclosure can also be implemented or applied through other different exemplary embodiments. Various modifications or changes can also be made to all details in the specification based on different points of view and applications without departing from the spirit of the present disclosure. It needs to be stated that the following embodiments and the features in the embodiments can be combined with one another under the situation of no conflict.

It needs to be stated that the drawings provided in the following embodiments are just used for schematically describing the basic concept of the present disclosure, thus only illustrating components only related to the present disclosure and are not drawn according to the numbers, shapes and sizes of components during actual implementation, the configuration, number and scale of each component during actual implementation thereof may be freely changed, and the component layout configuration thereof may be more complicated.

Figure 1:
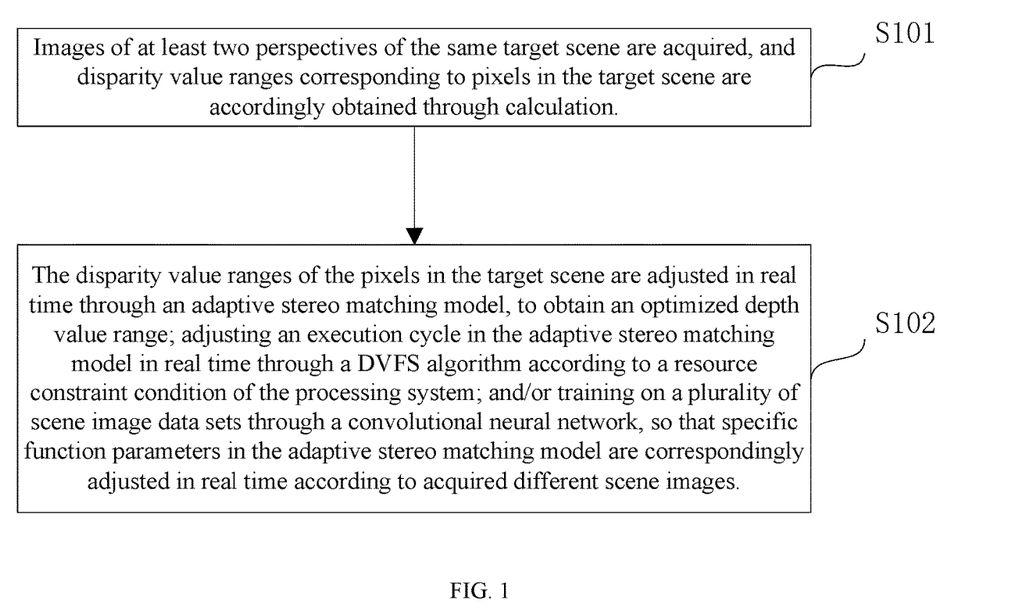
FIG. 1 shows a schematic flowchart of an adaptive stereo matching optimization method according to an embodiment of the present disclosure.

FIG. 1 shows a schematic flowchart of an adaptive stereo matching optimization method according to an embodiment of the present disclosure. As shown in the figure, the method is applied to a processing system, which may be a processor, a processing chip, a system on a chip, or the like.

The method includes:

S101: images of at least two perspectives of the same target scene are acquired, and disparity value ranges corresponding to pixels in the target scene are accordingly obtained through calculation.

In this embodiment, the stereo matching specifically adopts binocular stereo matching, that is, using two cameras to take pictures of the front object at the same time. In the two images simultaneously captured by the two cameras at two perspectives, the displacement between each pixel of the object on one image and the corresponding pixel on the same object in another perspective is defined as the disparity value. The disparity value can be used to estimate the depth of field (depth value) of the image, that is, the distance between the front object and the camera. As it is known that the depth of field is inversely proportional to the disparity, the estimation of the depth of field can be obtained from the disparity value. For obtaining the disparity value, generally, a maximum disparity value and a minimum disparity value are given to determine the range of detectable depth of field.

In this embodiment, images of at least two perspectives of the same target scene are acquired through an external binocular depth camera, or data of images of at least two perspectives of the same target scene is directly acquired, to further analyze and calculate the disparity value ranges of the pixels in the target scene.

S102: the disparity value ranges of the pixels in the target scene are adjusted in real time through an adaptive stereo matching model, to obtain an optimized depth value range; adjusting an execution cycle in the adaptive stereo matching model in real time through a DVFS algorithm according to a resource constraint condition of the processing system; and/or training on a plurality of scene image data sets through a convolutional neural network, so that specific function parameters in the adaptive stereo matching model are correspondingly adjusted in real time according to acquired different scene images.

It should be noted that when the disparity values (ranges) are different, it will cause different energy consumption and response time on the processing system (such as the on-board system processor). This is because increasing or decreasing the maximum disparity value would increase or decrease the calculation amount of the processing system accordingly (reflected in the number of processor operating clocks), which leads to an increase or decrease in the total power consumption and response time of the system. At the same time, there is an optimal combination for the processing system under different combinations of voltage and frequency, so that the maximum number of processor operating clocks can be achieved under the same constraint condition of energy consumption and response time. Therefore, the present disclosure provides a method for calculating the Dynamic Voltage and Frequency Scaling (DVFS) of a processing system using quadratic programming (QP) functions. The method can maximize the number of clocks (execution cycle) in which the processor runs the stereo matching algorithm, that is, to maximize the maximum disparity value or minimum disparity value.

Compared with the traditional advanced methods, the method described in the present disclosure optimizes the system quality instead of implicitly maximizing the CPU cycles; at the same time, compared with methods based on frequency scaling, the method described in the present disclosure can intelligently adjust the power supply voltage to utilize a larger optimization space. An effective quadratic programming formula is proposed, which enables the method described in the present disclosure to achieve quality optimization at a lower algorithmic cost.

In short, according to some system resource constraints of the processing system (smart vehicle platform), the energy of the vehicle system is limited, therefore, it is necessary to carefully plan how to use the energy, and it also requires good real-time performance. Thus, with the response time, energy, and heat constraints of the vehicle system, together with the maximum disparity value being adjusted in "real time" (such as increasing the maximum disparity value to make the depth of field measured by the camera smaller), the object closer to the camera can be measured. In this way, the output result of stereo matching is more accurate, that is, the measurement error of closer objects is reduced. Therefore, the maximum disparity value can be adjusted to achieve "adaptive" binocular stereo matching. If this adaptive improvement is achieved, the output results can be flexibly adjusted, such that the accuracy of the output results can be maximized when the system resources are sufficient, and be optimized by using available system resources when the system resources are insufficient.

The Dynamic Voltage and Frequency Scaling (DVFS) dynamically adjusts the voltage and frequency of the CPU according to the urgency of external events, to achieve a balance between response time and power consumption. DVFS is widely used in the field of energy-saving due to its dynamic adjustability to CPU voltage and frequency. For example, for a network video-on-demand server, DVFS technology can flexibly change the number of CPU cores and operating frequency of the video-on-demand server in the working state according to the number and level of network user on-demand requests and system performance when the system is running, handle users' video-on-demand requests and transmit the on-demand videos. In this way, the energy consumption of the network video-on-demand server can be reduced more effectively and reasonably without affecting the quality and delay of users' network video-on-demand.

In an embodiment of the present disclosure, the resource constraint condition of the processing system includes energy constraint, response time constraint, and heat constraint.

Specifically, 1) the energy constraint mainly refers to the power consumption constraint of the processing system, which mainly includes dynamic power consumption and static power consumption (including short-circuit power consumption and leakage current power consumption).

The dynamic power consumption is expressed as:

$$P_{i,dyn} = SW \cdot f_i \cdot v_i^2 \qquad (1)$$

SW is the average switched capacitor, $f_i$ is the frequency of the processing system, $v_i$ is the power supply voltage of the processing system.

To emphasize the effect of voltage, for the processing system p running under $f_i$ and voltage $v_i$, the expression is changed to:

$$P_{i,dyn} = C^{f_i} v_i^2 \qquad (2)$$

The static power consumption is expressed as:

$$P_{i,lkg} = P_{i0,lkg} + K_\alpha T_i + K_\beta v_i \qquad (3)$$

$P_{i0,lkg}$ represents the initial power of the specific linear part, $T_i$ is the temperature of the processing system, $v_i$ is the power supply voltage of the processing system, $K_\alpha$ and $K_\beta$ are respectively the slopes of the leakage current power corresponding to the temperature and voltage in a specific linear part.

The total power consumption of the processing system is expressed as:

$$P_i = C^{f_i} v_i^2 + P_{i0,lkg} + K_\alpha T_i + K_\beta v_i \qquad (4)$$

The total power consumption executes $o_i$ cycles (execution cycle) for task i, and the expression after substituting the cycle time $$t_i = \frac{o_i}{f_i}$$

into formula (4) is:

$$E_i = o_i f_i^{-1}(C^f v_i^2 + P_{i0,lkg} + K_\alpha T_i + K_\beta v_i) \quad (5)$$

Assuming that the voltage $v_i$ is given a voltage value, the choice of $f_i$ belongs to a corresponding discrete set $F_{v_i}$, namely $f_i \in F_{v_i}$.

Specifically, 2) the heat constraint mainly refers to the thermal energy consumption constraint of the processing system.

The thermal energy consumption on the processing system can be approximately represented by the thermal energy RC model:

$$C_p \frac{dT_i(t)}{dt} + \sum_{m \in M} G_{p,m}(T_i(t) - T_m(t)) + G_{p,env}(T_i(t) - T_{env}) = P_i \quad (6)$$

$\mathcal{M}$ is the collection of all adjacent processing systems, $G_{p,m}$ is the thermal conductivity between the processing system p and the adjacent processing system M, $T_{env}$ is the ambient air temperature, and $G_{p,env}$ is the thermal conductivity to the ambient air, including the thermal conductivities to the cover and bottom of the processing system.

By substituting formula (4) into formula (6) and considering the steady-state temperature only, the relationship matrix form between temperature and voltage is obtained as follows:

$$\vec{T}^l \leq \Psi_1^f \vec{v}^2 + \Psi_2^f \vec{v} + \Phi^{f,T} \leq \vec{T}^u \quad (7)$$

$\vec{v} = [v_1, v_2, \ldots, v_{numP}]^T$, $\vec{T}^l$ and $\vec{T}^u$ are respectively the vectors of the upper and lower limits of thermal energy; $\Psi_1^f$, $\Psi_2^f$ and $\Phi^{f,T}$ are coefficient matrices determined by frequency, power, and thermal conductivity, respectively.

In an embodiment of the present disclosure, the adaptive stereo matching model is an exponential function model.

In this embodiment, multiple image data sets are substituted into a linear model, power function model and exponential model respectively to describe the quality-cycle relationship, which is measured by the reciprocal number of the matching error. The model error is evaluated by the mean square error (MSE) between the original quality value and the fitting value. The MSE values of the <linear, power, exponential> models of three sample images are <0.3014, 0.0104, 0.0037>, <0.4598, 0.0185, 0.0042>, <0.2289, 0.1027, 0.0485>, respectively. The results show that the exponential model has better modeling accuracy than the linear model and the power function model. The exponential model most accurately models the quality period characteristics of stereo matching. Therefore, the adaptive stereo matching optimization method of the present disclosure adopts an exponential function model.

The specific formula for the adaptive stereo matching optimization is:

$$\mathcal{F}_e(o) = a \times \left(1 - e^{-\frac{o}{b}}\right) + m \quad (8)$$

a, b, m are specific function parameters; o is the execution cycle. Ideally, the parameters a, b, and m are input invariants and may be obtained through extensive analysis and curve fitting. However, for stereo matching applications, the parameters a, b, and m largely depends on the input images. m is calculated as 0.

Under satisfying the resource constraint condition of the processing system including energy constraint, response time constraint, and heat constraint, the method of adjusting the execution cycle in the adaptive stereo matching model in real time through the DVFS algorithm includes:

First, to maximize the output quality of the adaptive matching algorithm, that is, to reduce the error, the exponential function model (8) is transformed into a quality QP model, and the quality formula is obtained as follows:

$$\sum_i (\mathcal{F}_{e,i}(o_i + \Delta o_i) - \mathcal{F}_{e,i}(o_i)) = \sum_i a_i \left(-e^{-\frac{o_i + \Delta o_i}{b_i}} + e^{-\frac{o_i}{b_i}}\right) \quad (9)$$

$a_i$, $b_i$ are specific function parameters; $o_i$ is the initial execution cycle; $\Delta o_i$ is the execution cycle to be improved.

Second, to make the quality formula (9) easy to deal with, the formula (9) is expanded by Taylor's formula and deduced for a certain number of times to obtain the following transformation formula:

$$\sum_i a_i \left(\left(\frac{1}{2b_i^2}e^{-\frac{o_i}{b_i}}\right)\Delta o_i^2 + \left(-\frac{1}{b_i}e^{-\frac{o_i}{b_i}}\right)\Delta o_i\right) \quad (10)$$

The transformation formula (10) needs to satisfy the resource constraint condition of the processing system.

In an embodiment of the present disclosure, the formulas that the transformation formula (10) needs to satisfy the resource constraint condition of the processing system are:

A, energy constraint: $\Sigma_i(o_i + \Delta o_i)(C^f v_i^2 + K_\beta v_i + P_{i0,lkg} + K_\alpha T_i)f_i^{-1} \leq \epsilon_s$ (11)

$o_i$ is the initial execution cycle; $\Delta o_i$ is the execution cycle to be improved; $f_i$ is the frequency of the processing system; $v_i$ is the power supply voltage of the processing system; $C^f v_i^2$ represents dynamic power consumption; $P_{i0,lkg}$ represents the initial power of a specific linear part; $T_i$ is the temperature of the processing system; $K_\alpha$ and $K_\beta$ are respectively the slopes of the leakage current power corresponding to the temperature and voltage in the specific linear part; $C^f v_i^2 + K_\beta v_i + P_{i0,lkg} + K_\alpha T_i$ represents the total power; $\epsilon_s$ is the energy budget of the processing system.

In this embodiment, formula (11) is obtained from formula (5). The total energy consumption in the adaptive stereo matching model should not exceed the energy budget $\epsilon_s$ after changing the execution cycle $o_i$ to $o_i + \Delta o_i$. Here $T_i$ is selected as the upper temperature limit to avoid overheating of the system.

B, response time constraint:

$$\frac{(o_i + \Delta o_i)}{f_i} \leq \tau_s \quad (12)$$

$o_i$ is the initial execution cycle; $\Delta o_i$ is the execution cycle to be improved; $f_i$ is the frequency of the processing system; $\tau_s$ is the time budget of the processing system.

In this embodiment, the time budget $\tau_s$ restricts the execution of $o_i + \Delta o_i$ for each i, and the selection of $f_i$ belongs to a corresponding discrete set $F_{v_i}$, i.e., $f_i \in F_{v_i}$.

$$C, \text{heat constraint: } \vec{T}^l \leq \Psi_1^f \vec{v}^2 + \Psi_2^f \vec{v} + \Phi^{f,T} \leq \vec{T}^u \quad (13)$$

$\vec{T}^u$ and $\vec{T}^l$ are respectively the vectors of the upper limit and the lower limit of heat; $\Psi_1^f$, $\Psi_2^f$ and $\Phi^{f,T}$ are coefficient matrices determined by frequency, power and thermal conductivity, respectively.

In this embodiment, formula (13) is obtained from formula (7). The heat restriction is based on the static power consumption model of the piecewise linear part.

It should be noted that since formula (11) and formula (13) are nonlinear constraints, formulas (10)-(13) are not QP formulas yet. To linearize, the following transformation is performed:

1) decoupling the product form of formula (11), that is, replacing $v_i$ with a given value $v_i^*$.

2) replacing the variable in formula (13) with a set variable, that is, replacing $\Psi_1^f \vec{v}^2 + \Psi_2^f \vec{v}$ with a variable $\Theta$.

The following is obtained:

$$\sum_k a_i \left( \left( \frac{1}{2b_i^2} e^{-\frac{o_i}{b_i}} \right) \Delta o_i^2 + \left( -\frac{1}{b_i} e^{-\frac{o_i}{b_i}} \right) \Delta o_i \right) \quad (14)$$

The constraint conditions that need to be satisfied are:

$$\sum_k (o_i + \Delta o_i)\left( C^{f_i} v_i^{*2} + K_\beta v_i^* + P_{i0,1kg} + K_\alpha T_i \right) f_i^{-1} \leq \epsilon_s \quad (15)$$

$$\frac{(o_i + \Delta o_i)}{f_i} \leq \tau_s \quad (16)$$

$$\vec{T}^l \leq \Theta + \Phi^{f,T} \leq \vec{T}^u \quad (17)$$

In this embodiment, formulas (14)-(17) are quality quadratic programming QP formulas, which can be effectively solved by using an interior point method, to obtain the optimal execution cycle (or the number of operating clocks) of the processing system when the processing system has different energy consumption and response time.

In an embodiment of the present disclosure, the method of adjusting the disparity value ranges of the pixels in the target scene in real time through an adaptive stereo matching model to obtain an optimized depth value range includes: the depth value is inversely proportional to the disparity value, and the depth value range is estimated according to the disparity value range.

In this embodiment, the stereo matching specifically adopts binocular stereo matching, that is, using two cameras to take pictures of the front object at the same time. In the two images simultaneously captured by the two cameras at two perspectives, the displacement between each pixel of the object on one image and the corresponding pixel of the same object in another perspective is defined as the disparity value. The disparity value can be used to estimate the depth of field (depth value) of the image, that is, the distance between the front object and the camera. As is known that the depth of field is inversely proportional to the disparity, the depth of field can be estimated from the disparity value. To obtain the disparity value, generally, a maximum disparity value and a minimum disparity value are given to determine the range of the detectable depth of field.

In an embodiment of the present disclosure, the method of training on a plurality of scene image data sets through a convolutional neural network, so that the specific function parameters in the adaptive stereo matching model are correspondingly adjusted in real time according to the acquired different scene images includes:

a, the input terminal of the convolutional neural network is the scene image data set;

b, the output terminal of the convolutional neural network is the normalized probability of the estimated specific function parameters;

c, offline training on the plurality of scene image data sets, such that the specific function parameters in the adaptive stereo matching model are correspondingly adjusted in real time according to acquired different scene images.

It should be noted that each time the stereo matching is performed, since the acquired scene images are different, the specific function parameters in the adaptive stereo matching optimized formula (8) are different. Therefore, the fast and accurate estimation of the specific feature function is an important prerequisite for the operability of adaptive stereo matching optimization.

Due to the randomness and pervasiveness of the acquired scene images, the traditional methods based on extensive profiling or curve fitting are not applicable. Therefore, the present disclosure provides an inference method based on convolutional neural networks to achieve more efficient and accurate estimation of specific function parameters. The input terminal of the convolutional neural network is the image overall pixel set, and the output terminal is the normalized probability of the estimated coefficient. After offline training, the method of the present disclosure can quickly infer the quality function coefficient in real time with an accuracy of over 96%. For example, this method meets the requirements of intelligent on-board electronics systems for response time and energy consumption.

In this embodiment, the key to DVFS optimization lies in the accurate parameter estimation of the adaptive stereo matching model. The parameters of the traditional stereo matching function are mostly obtained through extensive profiling or curve fitting. However, scene images acquired in a motion state are highly dynamic, and it is impractical to use the traditional method. Supposing vehicles travel on limited streets most of the time. For example, a family car may be restricted to a limited number of routes in daily life scenarios. Therefore, the input image into the system is semantically restricted. Based on this, we propose two estimation methods of quality model parameters:

1) location similarity trigger feature point thresholding (L-FPT). L-FPT estimates the quality function based on the historical estimation of geographic locations with high input similarity;

2) street scene constrained CNN (S-CNN). S-CNN is a kind of neural network that trains and deduces mass functions that are only for specific streets.

For the L-FPT method, the vehicle may repeatedly encounter the same geographic location at the same or nearby location. In which instance an image $I_s$ is input, a historical image $I_s$ with high similarity can be displayed. In this case, the characteristics of the processing load are likely to be similar, so a similar quality function may describe the spatial recursive image.

The present disclosure evaluates the similarity of two images (i.e., the reference image and the compared image) by evaluating the feature point matching rate $R_{FP}$ of the compared image.

$$R_{FP} \triangleq \frac{N_{comp}}{N_{ref}} \times 100\%,$$

$N_{ref}$ is the number of ORB feature points of the reference image, and $N_{comp}$ is the number of feature points of the compared image. $N_{comp}$ and $N_{ref}$ can be obtained from the compared image and the reference image. The purpose is to obtain $R_{FP}$, which is an inherent preprocessing step of the most advanced stereo matching algorithms, especially the ELAS algorithm. Sobel filtering is used to generate feature points for subsequent operations.

To obtain the feature points, ready-made technologies such as Oriented FAST and Rotated BRIEF (ORB) may be used, which are easy to be used without incurring great overhead. A feature point matching rate $R_{FP}^{thresh}$ of the empirical threshold is introduced for identifying and recognizing spatially repeated images. For the two images, $R_{FP} \geq R_{FP}^{thresh}$ means that they may be slightly different horizontally, vertically, frontally, or behind. For example, $I_s$ may have a slightly different vehicle position compared to $I_{\tilde{s}}$, $I_s$ may be in front of or behind a position of $I_{\tilde{s}}$. Therefore, the practicality of L-FPT is greatly improved.

Secondly, for the CNN method, if it is considered that $R_{FP} < R_{FP}^{thresh}$ for $I_s$, then the result of L-FPT may be inaccurate. In this case, we propose a CNN-based solution to estimate the parameters of the quality function.

A simple design option is to use universal CNN. Universal CNN is a universal network to predict any single quality function in a given stereo image input from any street/segment. However, this may cause the weights to update slowly and lag behind the dynamically changing traffic context, resulting in inaccurate predictions and low training efficiency.

The present disclosure proposes a street scene constrained CNN (S-CNN), which is trained by the data of each street and used on the specific street where the vehicle is located. S-CNN is better than universal CNN and has improved efficiency and availability in the following aspects:

a) Training speed and network size. Compared with universal CNN, S-CNN has limited requirements for training data. Since the ground knowledge, that is, the passive objects on the street remain unchanged, the training adapts to changes faster and more likely. Although the over-fitting problem should be avoided in general, under limited input training data, a slight forced over-fitting helps "memory" instead of determining the potential distribution every time. Therefore, the training speed may be improved. S-CNN removes redundant variables and only asks relevant questions, making the network more concise and conducive to embedded processing.

b) Reusability and self-sufficiency. Instead of training a universal CNN for every vehicle, S-CNN faces the street so that different vehicles may share the same S-CNN whenever they are on the street. Assuming that the training takes place in the cloud, various vehicles may collaborate to provide training input images. Further, considering the independence of the street, a major change in one street does not affect the S-CNNs of another street, thus ensuring the overall quality function estimation performance during the vehicle's cruising activity.

In this embodiment, the prediction problem of the quality function parameters is transformed into a classification problem, and the value range of the parameters is subjected to uniform and fine-grained division. Therefore, the output of the network is a prediction of the "slot" where the parameter is most likely to fall. To this end, the present disclosure uses the LeNet network. In addition to the two fully connected layers, the network has two layers of convolution and pool operations. The output layer uses the softmax function to implement cross-entropy loss to evaluate the inconsistency of the output.

The adaptive stereo matching method of the present disclosure is tested and verified in an embodiment.

First, a simulation platform including three compute-intensive modules is developed. The modules are DVFS module, virtual processor and S-CNN inference module.

The DVFS module implements the algorithm and comparison algorithm described in the present disclosure. DVFS module inputs the quality function and all energy, time and heat constraints, and outputs the ASM execution cycle and voltage/frequency configuration. In this experiment, the highest temperature is set at 70° C., the initial frequency of all processors is set to 300 MHz, and the initial energy budget is 0.041 Each ASM task has an exponential quality periodic function that its parameters are input by the S-CNN inference network or the L-FPT estimator. Empirically speaking, the typical parameter values $a_i \in [0.2, 0.5]$ and $b_i \in [0.5, 1.2]$. The optimization of solution is carried out by a QP solver based on matlab.

The virtual processor is an abstract mathematical module that simulates the operation of ASM tasks. The processor is assumed to be 2×2 cores with voltage/frequency scaling capabilities. Each core independently runs the simulated ASM tasks without conflict. The power and thermal characteristics of the processor are obtained from PTScalar. The voltage of the processor ranges from 0.5V to 0.8V.

The S-CNN inference module infers the parameters of the exponential quality function. In the training phase, the S-CNN inference module is trained using the large data set captured by Carla simulator. Due to the huge data set, the image size is adjusted to 48*48, and the output layer is set to 50 tags to divide the coefficient interval in detail. To obtain the optimal accuracy, the training iteration number is set to 4000. S-CNN is implemented using Tensorflow.

In this test-and-verification embodiment, the adaptive stereo matching method of the present disclosure is tested by three data sets: Kitti, New Tsukuba, and Carla. Kitti and New Tsukuba are commonly used data sets in evaluating stereo matching algorithms. The Carla data set comes from the Carla simulator, and is used to support the development, training, and verification of intelligent vehicle systems. The performance of the adaptive stereo matching method of the present disclosure is compared with three other latest algorithms: (1) TS algorithm, a scheduling method to maximize system quality under energy constraints by selecting a task with the highest energy index. (2) DFS algorithm, a dynamic frequency scaling optimization scheduling method based on an exponential model. (3) ED algorithm, another simplified scheduling method, distributing the energy budget equally to all processors.

This test evaluates the accuracy of using exponential functions to model quality-cycle relationships. The exponential model is compared with the linear model and the power function model. Sample images are randomly selected from the three data sets, and the model error is tested by the curve fitting technique. The model error is evaluated by using the mean square error (MSE) between the original quality value and the fitted value. The modeling results of 20 sample images are randomly selected from three data sets. For the linear model, power function model and exponential model, the mean square errors are $10^{-1}$, $10^{-2}$ and $10^{-3}$, respectively. This indicates that the model error of using the standard exponential model is usually small.

According to the above test process, the effectiveness of the proposed DVFS algorithm for 60 randomly selected images is evaluated. By adopting the method of the present disclosure, the average results, including disparity/quality and execution cycle, may be improved, and the system voltage and energy consumption may be optimized. The execution results are compared with the initial disparities $d_{max}$, the initial disparities are 62, 72, and 38 respectively. The initial voltages are all set to 0.8. After applying the method described in the present disclosure, the disparity range of images of the data sets increases to 197, 203, and 59 respectively. The method described in the present disclosure achieves an overall quality improvement of 2.21 times, 1.93 times, and 1.60 times on the three data sets, respectively.

In addition, by selecting a sample test, the execution cycle is roughly between the initial and optimized disparity settings (50% within the range). It is found that the disparity value is also within the range, and is subject to the linear relationship between the disparity and the execution cycle. The output quality may not increase linearly with the execution cycle. On the contrary, as the cycle increases, the improvement speed becomes slower. The quality improvement rates before and after are <82.1%, 17.9%, <76.9%, 23.1%, <74.3%, 25.7%>. This validates our strategy of directly optimizing the ASM quality, instead of the ASM execution cycle, because for ASM tasks, quality does not increase evenly as the execution cycle increases.

The adaptive stereo matching method described in the present disclosure is compared with three algorithms of TS, DFS, and ED. Under different energy constraints, the average value of the algorithm is executed using 1000 straight road section images and 1000 crossroad images collected from Carla. The results show that the average quality of straight road section images using the adaptive stereo matching method is 1.61 times higher than ED, 2.78 times higher than TS, and 4 times higher than DFS. The average quality of crossroad images using the adaptive stereo matching method is 1.79 times higher than ED, 3.13 times higher than TS, and 3.75 times higher than DFS. In both cases, the adaptive stereo matching method of the present disclosure has the advantage over ED by optimizing the allocation of energy resources among processors rather than strictly allocating the energy budget. TS assigns the priority of the execution cycle according to the energy coefficient, rather than directly optimizing the quality. DFS only considers frequency scaling under 0.8V voltage. Although 0.8V voltage gives a maximum frequency scaling range, only considering the frequency scaling has a poor effect on improving the quality. This is because the important role of voltage in dynamic energy consumption and leakage energy consumption is ignored.

In addition, the inaccuracy brought by the quality measurement introduced by Taylor expansion is also tested. The optimization calculation adopts Taylor expansion, and the quality difference calculated according to the exponential model is looped in. With 20 samples tested, the maximum quality error due to Taylor's expansion is at a scale of $10^{-3}$.

L-FPT assumes that at a certain location (perhaps slightly shifted), the processor that executes the ASM tasks using the inputs shows a similar quality-cycle relationship. Therefore, the parameters may be inferred from the historical records of the same location. To verify this hypothesis, a fixed location is randomly selected from the Carla simulator and a reference image is taken. 300 images with increased density of vehicles and pedestrians are created manually. The purpose is to change the feature point matching rate $R_{FP}$ such that the function parameters are slightly different at a certain threshold $R_{FP}^{thresh}$, $R_{FP} \geq 85\%$, the parameter differences $|a_i-a_j|$ and $|b_i-b_j|$ are 3.38% and 3.19% respectively. Accordingly, $R_{FP} \geq 85\%$, ASM quality difference is limited to be within 7.15%.

Furthermore, to verify the accuracy of S-CNN, images of straight road sections of 10 different streets and crossroads of 10 different streets are collected in the Carla simulator. For each street, 14400 images with different densities of pedestrians or vehicles are randomly collected. The 14400 images are divided into a training set of 12000 images and a test set of 2400 images. The output layer of the prediction model coefficients is divided into 50 intervals, and the training iteration is adjusted to 4000 times. To train and test the universal CNN, one million images of pedestrians or vehicles with different densities throughout the simulated town are captured from the Carla simulator. In this data set, the straight part and the corner part are even numbers. 985000 images are used for training and 15000 images are used to test the performance of the universal CNN method.

The research results show that: (1) The accuracy of S-CNN for corner image prediction is lower than that for straight road image prediction. The average result shows that the prediction accuracy for $a_i$ and $b_i$ in the index model is lower than 17.9% and 12.6%, respectively. The MSE data is consistent with the above conclusion, indicating that S-CNN works well on straight roads, but performs poorly when turning at crossroads. This is consistent with the definition and motivation of S-CNN. (2) After adopting a mixed data set including straight road section images and corner images, universal CNN has poorer performance than S-CNN on pure straight road sections but better performance than S-CNN in pure corner scenes. (3) Though, in this work, the focus is on the exponential model, for linear and power function quality-cycle models (linear: $\mathcal{F}_\epsilon(o)=a \times o+b$, power function: $\mathcal{F}_\epsilon(o)=a \times o^b$), the predictive ability of S-CNN is still better in the case of straight roads. The above observations also apply to linear and power models. In addition, 492500 straight road part images are used for training and 1500 images are used for testing, the accuracy of the universal CNN is improved by 1.59%. However, compared with the data set of a single street, the data set is significantly larger.

For parameter prediction, regression-based methods have also been well recognized. The experiment is designed to evaluate the prediction accuracy of regression-based methods and S-CNN. The targets are again the exponential parameters $a_i$ and $b_i$, which indicates that the stereo matching images are in a quality-cycle relationship of a given machine. Two predictors related to stereo matching workloads are defined: (1) the number of matching feature points; (2) the Bhattacharyya coefficient, which is used to measure the similarity of two images. Bhattacharyya coefficient is the value range of the number of pixels represented by the histogram in the gray scale. Four algorithms are used to obtain the number of matching feature points, namely SURF, SIFT, ORB, and AKAZE provided in the OpenCV library. 10000 images are used for regression model training, and predictive ability $R^2$ and MSE results are used for evaluation. If $R^2$ is close to 1, then the regression is more successful. For example, $R^2=0.8$ means that 80% of all dependent variable changes (i.e., targets) can be explained by regression models. However, for all methods considered for testing, the results of $R^2$ close to 0 indicate that the regression methods may not have sufficient predictive ability in parameter estimation. Compared with CNN-based methods, the Fourier model with Bhattacharyya coefficient as a predictive factor is selected. The results show that the accuracy of MSE and regression is lower than that of CNN.

The proposed framework includes several important parts, such as ASM (ELAS) algorithm, parameter inference CNN and DVFS algorithm. In order to reflect the feasibility in the actual vehicle system, Xilinx UltraScale, ZCU102 and SDSoC frameworks are utilized. The three parts are deployed on FPGA for rapid verification. 10 sample images with a size of 1275×375 are randomly selected from the Carla data set. In addition, the same window sizes are used for the ELAS algorithm. The window sizes are 9×9 and 5×5, respectively. The number of support points is set to 32. For comparison, the clock frequency of all acceleration components is set to 300 MHz. The QP core is the core function of the DVFS algorithm. The reference implementation of QP solver is adopted. The external control logic is implemented by SDSoC. The times for DVFS and S-CNN inference are significantly less than that of ELAS algorithm, which indicates the timing feasibility of the method provided by the present disclosure in the actual system. Compared with the ED method that simplifies the energy constraint, the method of the present disclosure requires a longer time (2.99%) to achieve significant quality improvement.

In summary, the adaptive stereo matching method described in present disclosure may be used in processing systems, such as intelligent vehicle platforms. The method adjusts the execution cycle in the adaptive stereo matching model in real time through a DVFS algorithm, and trains on a plurality of scene image data sets through a convolutional neural network, so that the specific function parameters in the adaptive stereo matching model are correspondingly adjusted in real time according to the acquired different scene images. The results show that compared with the traditional technology, the adaptive stereo matching method described in the present disclosure has a quality improvement of at least 1.61 times and a parameter estimation accuracy of 96.7%.

Figure 2:
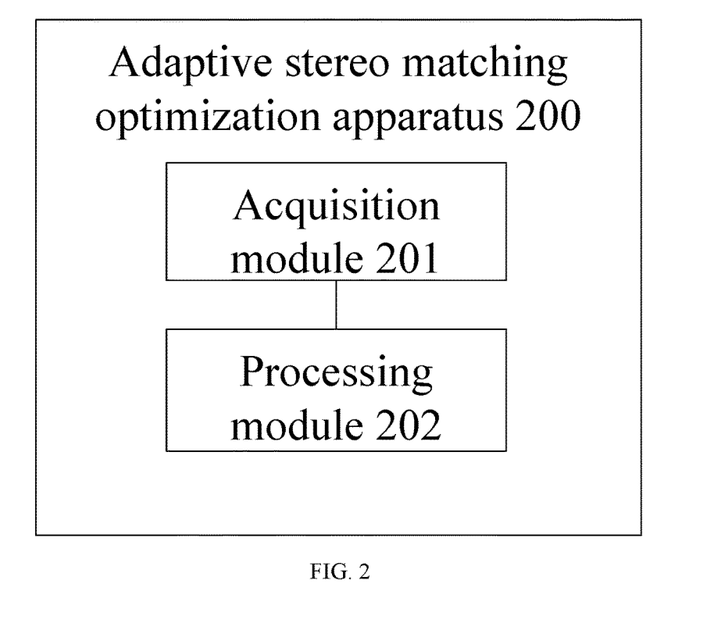
FIG. 2 shows a schematic diagram of an adaptive stereo matching optimization apparatus according to an embodiment of the present disclosure.

FIG. 2 shows a schematic diagram of modules of an adaptive stereo matching optimization apparatus in an embodiment of the present disclosure. The adaptive stereo matching optimization apparatus 200 includes an acquisition module 201 and a processing module 202.

The acquisition module 201 acquires images of at least two perspectives of the same target scene, to obtain, through calculation, disparity value ranges corresponding to pixels in the target scene.

The processing module 202 adjusts the disparity value ranges of the pixels in the target scene in real time through an adaptive stereo matching model, so as to obtain an optimized depth value range; the execution cycle in the adaptive stereo matching model is adjusted in real time through a DVFS algorithm according to a resource constraint condition of a processing system; and/or, a plurality of scene image data sets are trained through a convolutional neural network, so that the specific function parameters in the adaptive stereo matching model are correspondingly adjusted in real time according to acquired different scene images.

It is understood that the adaptive stereo matching optimization apparatus 200 can implement the adaptive stereo matching optimization method as described in FIG. 1 through the operation of each module.

It should be noted that the division of modules of the above apparatus is only a division of logical functions. In actual implementation, the modules may be integrated into one physical entity in whole or in part, or may be physically separated. These modules may all be implemented in the form of processing component calling by software. They may also be implemented entirely in hardware. It is also possible that some modules are implemented in the form of processing component calling by software, and some modules are implemented in the form of hardware. For example, the processing module 202 may be a separate processing element, or may be integrated in a chip of the above-mentioned apparatus, or may be stored in the memory of the above apparatus in the form of program code. The function of the above processing module 202 is called and executed by one of the processing elements of the above apparatus. The implementation of other modules is similar. In addition, all or part of these modules may be integrated or implemented independently. The processing elements described herein may be an integrated circuit with signal processing capabilities. In the implementation process, the operations of the above method or the above modules may be completed by an integrated logic circuit of hardware in the processor component or instruction of a software.

For example, the above modules may be one or more integrated circuits configured to implement the above method, such as one or more Application Specific Integrated Circuits (ASICs), or one or more Digital Signal Processors (DSPs), or one or more Field Programmable Gate Arrays (FPGAs). As another example, when one of the above modules is implemented in the form of calling program codes of a processing component, the processing component may be a general processor, such as a Central Processing Unit (CPU) or other processors that may call program codes. As another example, these modules may be integrated and implemented in the form of a system-on-a-chip (SOC).

Figure 3:
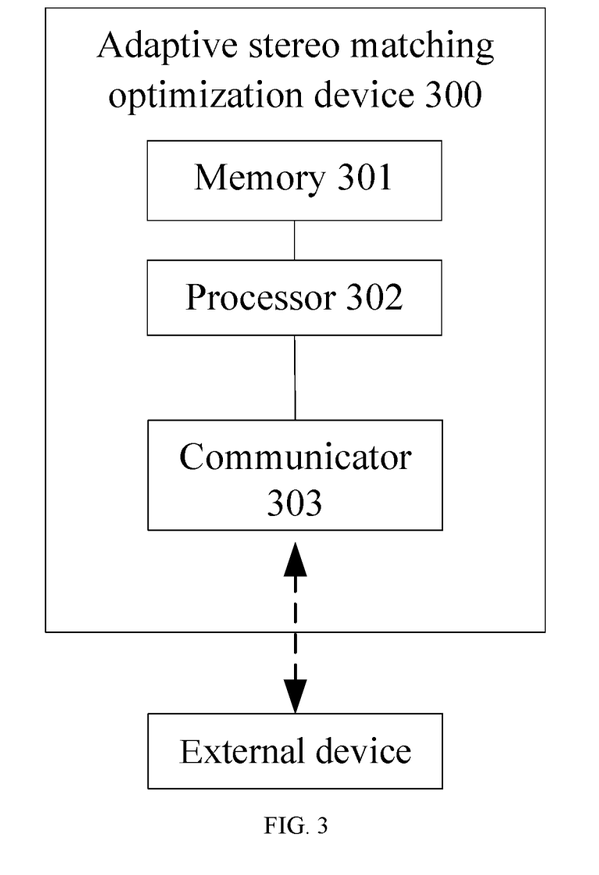
FIG. 3 shows a schematic diagram of an adaptive stereo matching optimization device according to an embodiment of the present disclosure.

FIG. 3 shows a schematic diagram of the adaptive stereo matching optimization device in an embodiment of the present disclosure. The adaptive stereo matching optimization device 300 includes a memory 301, a processor 302, and a communicator 303. The memory 301 stores a computer program, and the processor 302 executes the computer program to implement the adaptive stereo matching optimization method as described in FIG. 1. The communicator 303 communicably connects with external devices.

In this embodiment, the terminal device 300 may be a processor system, such as an on-board system, a server, a computer, and other terminal devices with a processor or a controller system. The external device may be a binocular depth camera, an ordinary camera, and the like.

The memory 301 may include a Random Access Memory (RAM), or may further include a non-volatile memory, such as at least one disk memory.

The processor 302 may be a general processor, including a Central Processing Unit (CPU), a Network Processor (NP), and the like. It may also be a Digital Signal Processor (DSP), an Application Specific Integrated Circuit (ASIC), a Field-Programmable Gate Array (FPGA), or other programmable logic devices, discrete gate or transistor logic devices, or discrete hardware components.

The communicator 303 is used to implement the communication connection between other devices (such as a client, a controller, a read-write library, and a read-only library). The communicator 303 may include one or more groups of modules with different communication modes. The communication connection may be one or more wired/wireless communication modes and combinations thereof. The communication modes include: Internet, CAN, intranet, wide area network (WAN), local area network (LAN), wireless network, digital subscriber line (DSL) network, frame relay network, asynchronous transfer mode (ATM) network, virtual private network (VPN) and/or any one or more of other appropriate communication networks, such as any one or combinations of WIFI, Bluetooth, NFC, GPRS, GSM, and Ethernet.

In an embodiment, the present disclosure provides a readable storage medium, which stores a computer program. When the computer program is executed by the processor, the adaptive stereo matching optimization method described in FIG. 1 is implemented.

For the computer readable storage medium, those of ordinary skill will understand that all or part of the operations to implement the various method embodiments described above may be accomplished by hardware associated with a computer program. The foregoing image processing program may be stored in a computer readable storage medium. The program, when executed, performs the operations including the above method embodiments. The foregoing storage medium includes various mediums that may store program codes, such as a ROM, a RAM, a magnetic disk, or an optical disk.

These computer programs may also be loaded onto a computer or other programmable data processing equipment, such that a series of operation steps are executed on the computer or other programmable equipment to produce computer-implemented processing. Thus, the instructions executed on the computer or other programmable equipment provide steps for implementing the functions specified in one or more processes in the flowchart and/or one or more blocks in the block diagram.

The computer readable medium includes volatile and nonvolatile, removable and non-removable medium implemented in any method or technology for storage of information. The information may be computer readable instructions, data structures, program modules or other data. Examples of computer storage medium include, but are not limited to, phase change memory (PRAM), static random access memory (SRAM), dynamic random access memory (DRAM), other types of random access memory (RAM), read-only memory (ROM), electrically erasable programmable read-only memory (EEPROM), flash memory or other memory technology, compact disk read-only memory (CD-ROM), digital versatile disc (DVD) or other optical storage, magnetic tape, magnetic tape disk storage or other magnetic storage devices, or any other non-transmission medium that can be used to store information for access by a computing device. According to the definition of the present disclosure, the computer-readable medium does not include transitory media, such as modulated data signals and carrier waves.

In summary, the present disclosure provides an adaptive stereo matching optimization method, apparatus, and device and a storage medium. The method includes: acquiring images of at least two perspectives of the same target scene, accordingly obtaining, through calculation, disparity value ranges corresponding to pixels in the target scene, and obtaining optimized depth value ranges by adjusting the disparity value ranges of the pixels in the target scene in real time through an adaptive stereo matching model; adjusting an execution cycle in the adaptive stereo matching model in real time through a DVFS algorithm according to a resource constraint condition of the processing system; and/or training on a plurality of scene image data sets through a convolutional neural network, so that specific function parameters in the adaptive stereo matching model are correspondingly adjusted in real time according to acquired different scene images.

The present disclosure effectively overcomes various shortcomings in the traditional technology and has high industrial utilization value.

The above-mentioned embodiments are merely illustrative of the principle and effects of the present disclosure instead of limiting the present disclosure. Modifications or variations of the above-described embodiments may be made by those skilled in the art without departing from the spirit and scope of the present disclosure. Therefore, all equivalent modifications or changes made by those who have common knowledge in the art without departing from the spirit and technical concept disclosed by the present disclosure shall be still covered by the claims of the present disclosure.

The invention claimed is:

1. An adaptive stereo matching optimization method, wherein the method is applied to a processing system and comprises:
   acquiring images of at least two perspectives of a same target scene with a binocular depth camera, and accordingly obtaining, through calculation, disparity value ranges of the binocular depth camera corresponding to pixels in the target scene;
   adjusting depth value ranges of the binocular depth camera by adjusting a maximum disparity value of the binocular depth camera corresponding to the pixels in the target scene in real time through an adaptive stereo matching model; adjusting an execution cycle in the adaptive stereo matching model in real time through a DVFS algorithm according to a resource constraint condition of the processing system; and training on a plurality of scene image data sets through a convolutional neural network, so that specific function parameters in the adaptive stereo matching model are correspondingly adjusted in real time according to acquired different scene images.

2. The adaptive stereo matching optimization method according to claim 1, wherein the resource constraint condition of the processing system comprises: energy constraint, response time constraint, and heat constraint.

3. The adaptive stereo matching optimization method according to claim 2, wherein the heat constraint comprises a thermal conductivity between the processing system and other adjacent processing systems, an ambient air temperature, and a thermal conductivity between a body of the processing system and a cover/bottom of the processing system.

4. The adaptive stereo matching optimization method according to claim 1, wherein the adaptive stereo matching model is an exponential function model, and the specific formula is:

$$\mathcal{F}_e(o) = a \times \left(1 - e^{-\frac{o}{b}}\right) + m;$$

wherein, a, b, m are the specific function parameters; o is the execution cycle.

5. The adaptive stereo matching optimization method according to claim 4, wherein the resource constraint condition of the processing system comprises: energy constraint, response time constraint, and heat constraint; the adjusting of the execution cycle in the adaptive stereo matching model in real time through the DVFS algorithm includes:

converting the exponential function model into a quality quadratic programming (QP) model, and obtaining a quality formula as follows:

$$\sum_i (\mathcal{F}_{e,i}(o_i + \Delta o_i) - \mathcal{F}_{e,i}(o_i)) = \sum_i a_i \left( -e^{-\frac{o_i + \Delta o_i}{b_i}} + e^{-\frac{o_i}{b_i}} \right);$$

wherein, $a_i, b_i$ are specific function parameters; $o_i$ is an initial execution cycle; $\Delta o_i$ is an execution cycle to be improved;

after Taylor formula expansion and a certain number of derivations, a transformation formula is obtained as follows:

$$\sum_i a_i \left( \left( \frac{1}{2b_i^2} e^{-\frac{o_i}{b_i}} \right) \Delta o_i^2 + \left( -\frac{1}{b_i} e^{-\frac{o_i}{b_i}} \right) \Delta o_i \right);$$

wherein, the transformation formula satisfies the resource constraint condition of the processing system.

6. The adaptive stereo matching optimization method according to claim 5, wherein formulas that the transformation formula satisfies the resource constraint condition of the processing system include:

A, energy constraint: $\Sigma_i (o_i + \Delta o_i)(C^{f_i} v_i^2 + K_\beta v_i + P_{i0,lkg} + K_\alpha T_i) f_i^{-1} \leq \epsilon_s$;

wherein, $o_i$ is the initial execution cycle; $\Delta o_i$ is the execution cycle to be improved; $f_i$ is a frequency of the processing system; $v_i$ is a power supply voltage of the processing system; $C^{f_i} v_i^2$ represents a dynamic power consumption; $P_{i0,lkg}$ represents an initial power of a specific linear part; $T_i$ is a temperature of the processing system; $K_\alpha$ and $K_\beta$ are slopes of a leakage current power corresponding to a temperature and a voltage in the specific linear part, respectively; $C^{f_i} v_i^2 + K_\beta v_i + P_{i0,lkg} + K_\alpha T_i$ represents a total power; $\epsilon_s$ is an energy budget of the processing system;

B, response time constraint:

$$\frac{(o_i + \Delta o_i)}{f_i} \leq \tau_s;$$

wherein, $o_i$ is the initial execution cycle; $\Delta o_i$ is the execution cycle to be improved; $f_i$ is the frequency of the processing system; $\tau_s$ is a time budget of the processing system;

C, heat constraint: $\vec{T}^l \geq \psi_1^f \vec{v}^2 + \psi_2^f \vec{v} + \Phi^{f,T} \leq \vec{T}^u$;

wherein, $\vec{v} = [v_1, v_2, \ldots, v_{numP}]^T$; $\vec{T}^u$ and $\vec{T}^l$ are vectors of an upper limit and a lower limit of heat, respectively; $\Psi_1^f$, $\Psi_2^f$ and $\Phi^{f,T}$ are coefficient matrices determined by frequency, power, and thermal conductivity, respectively.

7. The adaptive stereo matching optimization method according to claim 1, wherein the obtaining of the optimized depth value ranges by adjusting the disparity value ranges of the pixels in the target scene in real time through the adaptive stereo matching model includes:

estimating the depth value range according to the disparity value range, wherein the depth value is inversely proportional to the disparity value.

8. The adaptive stereo matching optimization method according to claim 1, wherein the training on the plurality of scene image data sets through the convolutional neural network, so that the specific function parameters in the adaptive stereo matching model are correspondingly adjusted in real time according to the acquired different scene images includes:

an input terminal of the convolutional neural network is the scene image data set;

an output terminal of the convolutional neural network is a normalized probability of estimated specific function parameters;

offline training on the plurality of scene image data sets, such that the specific function parameters in the adaptive stereo matching model are correspondingly adjusted in real time according to the acquired different scene images.

9. An adaptive stereo matching optimization device, comprising:

a memory storing a computer program; a processor for executing the computer program stored in the memory, when the computer program is executed, the adaptive stereo matching optimization method according to claim 1 is implemented; and a communicator for communicably connecting with external devices.

10. A non-transitory computer readable storage medium, storing a computer program, wherein when the computer program is executed by a processor, the adaptive stereo matching optimization method according to claim 1 is implemented.

11. The adaptive stereo matching optimization method according to claim 1, wherein the convolutional neural network comprises street scene constrained convolutional neural networks (S-CNN), each of which corresponds to one unique street.

12. An adaptive stereo matching optimization apparatus, comprising:

an acquisition module comprising a binocular depth camera, for acquiring images of at least two perspectives of a same target scene and obtaining, through calculation, disparity value ranges of the binocular depth camera corresponding to pixels in the target scene;

a processing module, for adjusting depth value ranges of the binocular depth camera by adjusting a maximum disparity value of the binocular depth camera corresponding to the pixels in the target scene in real time through an adaptive stereo matching model; adjusting an execution cycle in the adaptive stereo matching model in real time through a DVFS algorithm according to a resource constraint condition of a processing system; and training on a plurality of scene image data sets through a convolutional neural network, so that specific function parameters in the adaptive stereo matching model are correspondingly adjusted in real time according to acquired different scene images.

* * * * *